United States Patent
Bourlotos et al.

(10) Patent No.: US 12,151,961 B2
(45) Date of Patent: Nov. 26, 2024

(54) APPARATUS FOR MANUFACTURING A RIBBON

(71) Applicant: Corning Incorporated, Corning, NY (US)

(72) Inventors: Kathryn Jean Russell Bourlotos, Frankfort, KY (US); Gilbert De Angelis, Lindley, NY (US); Dale Madard Fisher, Jr., Painted Post, NY (US); Chunhong Chelsie He, Horseheads, NY (US); Timothy Joseph Helmers, Danville, KY (US); Benjamin Pelham Schrock, Wilmington, NC (US); Christopher Myron Smith, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 403 days.

(21) Appl. No.: 17/619,083

(22) PCT Filed: Jun. 10, 2020

(86) PCT No.: PCT/US2020/036898
§ 371 (c)(1),
(2) Date: Dec. 14, 2021

(87) PCT Pub. No.: WO2020/263562
PCT Pub. Date: Dec. 30, 2020

(65) Prior Publication Data
US 2022/0298051 A1    Sep. 22, 2022

Related U.S. Application Data

(60) Provisional application No. 62/866,945, filed on Jun. 26, 2019.

(51) Int. Cl.
*C03B 17/06*    (2006.01)
*C03B 13/04*    (2006.01)

(52) U.S. Cl.
CPC ........... *C03B 13/04* (2013.01); *C03B 17/067* (2013.01)

(58) Field of Classification Search
CPC ............................... C03B 17/06; B22D 41/60
See application file for complete search history.

(56) References Cited

U.S. PATENT DOCUMENTS 4,989,017 A * 1/1991 Oda ........................... B41J 2/32
347/205
5,925,161 A * 7/1999 Dembicki ................. C03B 7/14
65/129

(Continued)

FOREIGN PATENT DOCUMENTS

CN    203411458 U  *  1/2014  ............. C03B 17/06
CN    110255866 A  *  9/2019  ............. C03B 17/06

(Continued)

OTHER PUBLICATIONS

International Search Report and Written Opinion of the International Searching Authority; PCT/US2020/036898; dated Nov. 2, 2020; 13 pages; European Patent Office.

*Primary Examiner* — Alison L Hindenlang
*Assistant Examiner* — Steven S Lee
(74) *Attorney, Agent, or Firm* — Kevin M. Able

(57) ABSTRACT

A glass manufacturing apparatus includes a delivery tube terminating at a lower end in a delivery slot. A stream of molten material is delivered along a travel plane in a travel direction. A first plate is positioned adjacent the lower end of the delivery tube on a first side of the travel plane. The first plate includes a first edge extending adjacent the travel plane and a first thermal expansion slot extending from the first edge to a first interior. A second plate is positioned (Continued)

adjacent the lower end of the delivery tube on a second side of the travel plane. The second plate includes a second edge extending adjacent the travel plane and a second thermal expansion slot extending from the second edge to a second interior. The second edge is spaced apart from the first edge to define a delivery opening through which the delivery tube extends.

20 Claims, 9 Drawing Sheets

(56) References Cited

U.S. PATENT DOCUMENTS

| | | |
|---|---|---|
| 6,620,350 B2 | 9/2003 | Chen |
| 8,689,585 B2 | 4/2014 | Delia et al. |
| 8,713,972 B2 | 5/2014 | Lakota et al. |
| 9,556,055 B2 | 1/2017 | Likitvanichkul et al. |
| 9,643,872 B2 | 5/2017 | Fredholm |
| 2009/0019892 A1* | 1/2009 | Fredholm ............... C03B 40/04 65/183 |
| 2010/0083872 A1* | 4/2010 | Kitamura .......... C04B 35/62897 106/456 |
| 2011/0289969 A1* | 12/2011 | Delia .................... C03B 17/067 65/195 |
| 2014/0283554 A1 | 9/2014 | Fredholm |
| 2016/0185643 A1* | 6/2016 | Kersting ................. C03B 17/02 65/195 |
| 2016/0190640 A1* | 6/2016 | Visco .................. H01M 50/437 429/322 |
| 2018/0354837 A1* | 12/2018 | Kim ......................... C03B 7/06 |
| 2018/0370835 A1* | 12/2018 | Otter ....................... C03B 17/04 |
| 2019/0152825 A1 | 5/2019 | Fournel et al. |

FOREIGN PATENT DOCUMENTS

| | | | | |
|---|---|---|---|---|
| CN | 110563323 A | * | 12/2019 | ............. C03B 37/08 |
| CN | 110590132 A | * | 12/2019 | ............. C03B 17/06 |
| JP | S6221034 U | * | 2/1987 | ............. C03B 17/06 |
| JP | H1059732 A | * | 3/1998 | .......... C03B 17/067 |
| JP | H10324531 A | * | 12/1998 | ............. C03B 17/06 |
| JP | 2000335924 A | * | 12/2000 | ............. C03B 17/06 |
| JP | 2014162659 A | * | 9/2014 | .......... C03B 17/067 |
| WO | 2017/192634 A1 | | 11/2017 | |

* cited by examiner

APPARATUS FOR MANUFACTURING A RIBBON

CROSS-REFERENCE TO RELATED APPLICATIONS

This application claims the benefit of priority under 35 U.S.C. § 371 of International Application No. PCT/US2020/036898, filed on Jun. 10, 2020, which claims the benefit of priority of U.S. Provisional Application Ser. No. 62/866,945 filed on Jun. 26, 2019 the contents of which are relied upon and incorporated herein by reference in their entity.

FIELD

The present disclosure relates generally to methods for manufacturing a ribbon and, more particularly, to methods for manufacturing a ribbon with a glass manufacturing apparatus comprising a plate.

BACKGROUND

It is known to manufacture molten material into a ribbon with a glass manufacturing apparatus. To control a temperature of a stream of molten material exiting a supply vessel, one or more plates can be provided adjacent the exit of the supply vessel. However, the one or more plates may be exposed to a range of temperatures that can cause thermal deformation of the one or more plates, which, in some cases, can cause permanent deformation. Further, contamination of the supply vessel due to gases generated by the stream of molten material may be possible, as are temperature variations across the stream of molten material.

SUMMARY

The following presents a simplified summary of the disclosure to provide a basic understanding of some embodiments described in the detailed description.

Accordingly, a glass manufacturing apparatus is disclosed comprising a delivery tube terminating at a lower end in a delivery slot. The delivery tube can be configured to deliver a stream of molten material through the delivery slot along a travel plane in a travel direction to a forming apparatus. The glass manufacturing apparatus can comprise a first plate positioned adjacent the lower end of the delivery tube on a first side of the travel plane. The first plate can comprise a first edge extending adjacent the travel plane, for example parallel with the travel plane, and a first thermal expansion slot extending from the first edge to a first interior of the first plate. For example, the first thermal expansion slot can intersect the first edge and extend inward from the first edge toward the interior of the first plate. In some embodiments, the first expansion slot can be orthogonal (90°) to the first edge, although in further embodiments, the first expansion slot can extend at other angles to the first edge. In some embodiments, a width of the first thermal expansion slot can vary, for example along a length of the first thermal expansion slot. The glass manufacturing apparatus may further comprise a second plate positioned adjacent the lower end of the delivery tube on a second side of the travel plane, for example in a mirror position of the first plate. The second plate can comprise a second edge extending adjacent the travel plane, for example parallel with the travel plane, and may comprise a second thermal expansion slot extending from the second edge to a second interior of the second plate. For example, the second thermal expansion slot can intersect the second edge and extend from the second edge inward toward the interior of the second plate. In some embodiments, the second expansion slot can be orthogonal (90°) to the second edge, although in further embodiments, the second expansion slot can extend at other angles to the second edge. The second edge can be spaced apart from the first edge to define a delivery opening through which the delivery tube extends.

In some embodiments, the forming apparatus can comprise a pair of forming rolls spaced apart and defining a gap therebetween, the pair of forming rolls configured to receive the stream of molten material within the gap.

In various embodiments, the first plate can comprise a first plurality of thermal expansion slots and the second plate can comprise a second plurality of thermal expansion slots.

In some embodiments, the first plate can comprise a first passage configured to direct a first gas flow towards the travel plane. For example, in some embodiments, the first plate can comprise a first plate layer and a second plate layer attached to the first plate layer, the first plate layer spaced apart from the second plate layer to form the first passage between the first plate layer and the second plate layer. The first passage can terminate at a first elongated orifice extending along at least a portion of a length of the first edge, wherein the first passage can be coupled to a first gas source.

In some embodiments, the second plate can comprise a second passage configured to direct a second gas flow towards the travel plane. For example, the second plate can comprise a third plate layer and a fourth plate layer attached to the third plate layer, the third plate layer spaced apart from the fourth plate layer to form the second passage between the third plate layer and the fourth plate layer. The second passage can terminate at a second elongated orifice extending along at least a portion of a length of the second edge, wherein the second passage can be coupled to a second gas source, although in further embodiments, the second passage may be coupled to the first gas source.

In some embodiments, the first plate can comprise a first electrically conductive layer and a first thermally insulating layer attached to the first electrically conductive layer. For example, the first thermally insulating layer can comprise a plurality of thermally insulating layers.

In some embodiments, the first plate can comprise a first electrically isolating member positioned on at least a portion of the first edge.

In some embodiments, the second plate can comprise a second electrically conductive layer and a second thermally insulating layer attached to the second electrically conductive layer.

In some embodiments, the second plate can comprise a second electrically isolating member positioned on at least a portion of the second edge.

In another embodiment, a glass manufacturing apparatus is described comprising a delivery tube terminating at a lower end in a delivery slot. The delivery tube can be configured to deliver a stream of molten material through the delivery slot along a travel plane in a travel direction to a forming apparatus. The glass manufacturing apparatus may further comprise a first plate positioned adjacent the lower end of the delivery tube on a first side of the travel plane. The first plate can comprise a first edge extending adjacent the travel plane and a first passage configured to direct a first gas flow from the first edge towards the travel plane.

The glass manufacturing apparatus may further comprise a second plate positioned adjacent the lower end of the delivery tube on a second side of the travel plane. The second plate can comprise a second edge extending adjacent the travel plane and a second passage configured to direct a second gas flow from the second edge towards the travel plane. The second edge can be spaced apart from the first edge to define a delivery opening through which the delivery tube extends.

In some embodiments, the first plate can comprise a first plate layer and a second plate layer attached to the first plate layer, the first plate layer spaced apart from the second plate layer to form the first passage between the first plate layer and the second plate layer. The first passage can terminate at a first elongated orifice extending along at least a portion of a length of the first edge, wherein the first passage can be coupled to a first gas source.

In some embodiments, the first passage can extend along a first axis that intersects the travel plane, the first axis defining a first angle relative to the travel plane that is within a range from about 20 degrees to about 70 degrees.

In still another embodiment, a glass manufacturing apparatus is disclosed comprising a delivery tube terminating at a lower end in a delivery slot. The delivery tube can be configured to deliver a stream of molten material through the delivery slot along a travel plane in a travel direction to a forming apparatus. The glass manufacturing apparatus may further comprise a first plate positioned adjacent the lower end of the delivery tube on a first side of the travel plane. The first plate can comprise a first electrically conductive layer and a first thermally insulating layer attached to the first electrically conductive layer and configured to maintain a temperature of the molten material exiting the delivery tube through the delivery slot. The glass manufacturing apparatus may further comprise a second plate positioned adjacent the lower end of the delivery tube on a second side of the travel plane, the second plate comprising a second edge spaced apart from the first edge to define a delivery opening within which the delivery tube extends.

In some embodiments, the first plate can comprise a first electrically isolating member positioned on at least a portion of a first edge of the first plate, the first electrically isolating member configured to electrically isolate the first electrically conductive layer from the delivery tube.

In some embodiments, the first electrically isolating member can comprise a ceramic material.

In some embodiments, the first thermally insulating layer can comprise a plurality of thermally insulating layers.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other features, embodiments and advantages are better understood when the following detailed description is read with reference to the accompanying drawings, in which.

DETAILED DESCRIPTION

Figure 1:
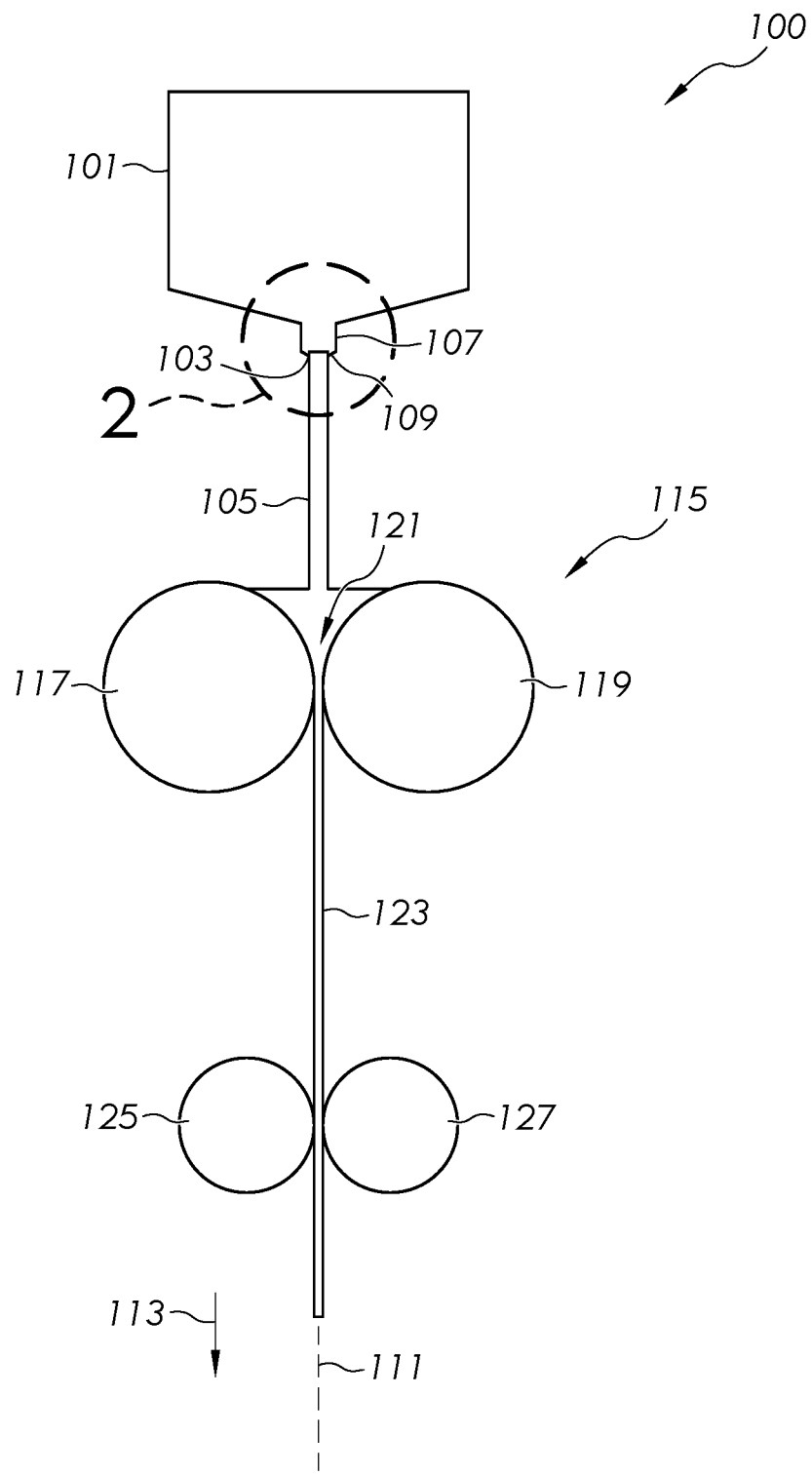
FIG. 1 schematically illustrates example embodiments of a glass manufacturing apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

The present disclosure relates to a glass manufacturing apparatus and methods for forming a stream of molten material. Methods and apparatus for forming a stream of molten material will now be described by way of example embodiments. As schematically illustrated in FIG. 1, in some embodiments, an exemplary glass manufacturing apparatus 100 can comprise a supply vessel 101 with a delivery slot 103 to slot draw a stream of molten material 105. In some embodiments, the supply vessel 101 can comprise a delivery tube 107 terminating at a lower end 109 in the delivery slot 103. For example, the delivery tube 107 may comprise a passageway through which the stream of molten material 105 can exit the supply vessel 101. The delivery slot 103 may comprise an opening, a hole etc. through which the stream of molten material 105 can exit the delivery tube 107. In some embodiments, the delivery tube 107 can be oriented along a direction of gravity, such that the stream of molten material 105 can flow downwardly along the direction of gravity through the delivery tube 107.

In some embodiments, the delivery tube 107 can deliver the stream of molten material 105 through the delivery slot 103 along a travel plane 111 in a travel direction 113 to a forming apparatus 115. The forming apparatus 115 can comprise a pair of opposing forming rolls 117, 119 spaced apart and defining a gap 121. In some embodiments, the pair of opposing forming rolls 117, 119 can rotate counter to one another. For example, in the orientation shown in FIG. 1, one forming roll 117 can rotate in a clockwise direction while the other forming roll 119 can rotate in a counterclockwise direction. In some embodiments, the pair of opposing forming rolls 117 can receive the stream of molten material 105 within the gap 121. The stream of molten material 105 can accumulate between the forming rolls 117, 119, whereupon the forming rolls 117, 119 can flatten, thin, and smooth the stream of molten material 105 into a ribbon 123. The ribbon 123 can exit the forming rolls 117, 119 and may be delivered to a pair of pulling rolls 125, 127. The pulling rolls 125, 127 can pull downwardly on the ribbon 123 and, in some embodiments, can generate a tension in the ribbon 123 to stabilize and/or stretch the ribbon 123. In some embodiments, the pulling rolls 125, 127 can rotate counter to one another. For example, in the orientation shown in FIG. 1, one pulling roll 125 can rotate in a clockwise direction while the other pulling roll 127 can rotate in a counterclockwise direction. In some embodiments, the ribbon 123 can move along the travel plane 111 in the travel direction 113. In some embodiments, the ribbon 123 can comprise one or more states of material based on the vertical location of the ribbon 123. For example, at one location (e.g., directly below the forming rolls 117, 119), the ribbon 123 can comprise a viscous material, while at another location (e.g., directly above the pulling rolls 125, 127), the ribbon 123 can comprise an amorphous solid in a glassy state.

Figure 2:
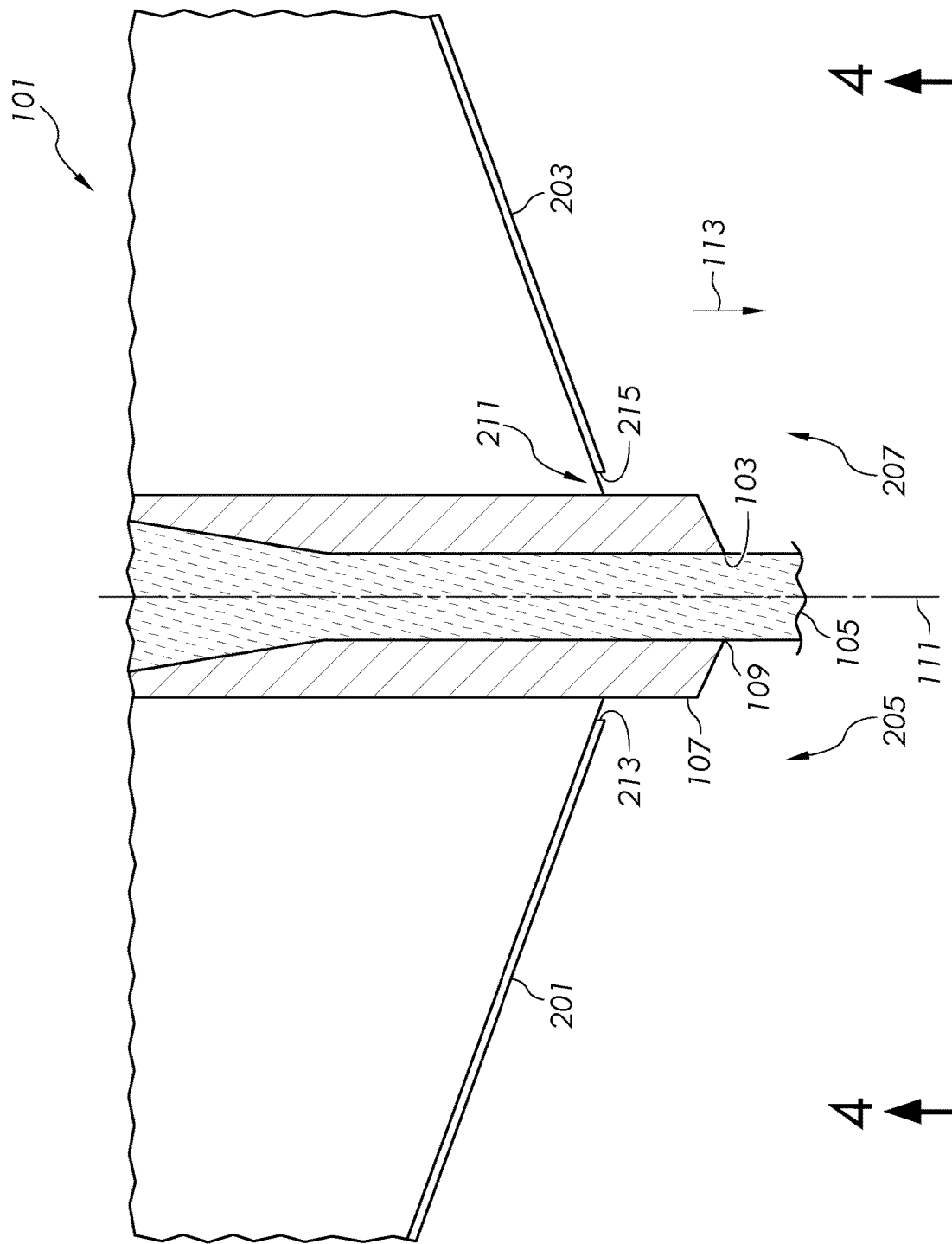
FIG. 2 illustrates an enlarged portion of the glass manufacturing apparatus comprising a first plate and a second plate in accordance with embodiments of the disclosure.

FIG. 2 illustrates an enlarged, side view of a bottom of the supply vessel 101 taken at view 2 of FIG. 1. In some embodiments, the supply vessel 101 can comprise a first plate 201 and a second plate 203. The travel plane 111 along which the stream of molten material 105 extends can define a first side 205 and a second side 207 that is opposite the first side 205. In some embodiments, the first plate 201 can be positioned adjacent the lower end 109 of the delivery tube 107 on the first side 205 of the travel plane 111. The second plate 203 can be positioned adjacent the lower end of the delivery tube 107 on the second side 207 of the travel plane 111. The first plate 201 and the second plate 203 can be spaced apart to form a delivery opening 211 therebetween, with one or more of the delivery tube 107 or the stream of molten material 105 extending through the delivery opening 211. For example, in some embodiments, the delivery tube 107 and the stream of molten material 105 can extend between the first plate 201 and the second plate 203. In some embodiments, the delivery tube 107 can extend through the delivery opening 211 such that the lower end 109 of the delivery tube 107 may be located below the first plate 201 and the second plate 203.

In some embodiments, the first plate 201 can comprise a first edge 213 extending adjacent the travel plane 111. The second plate 203 can comprise a second edge 215 extending adjacent the travel plane 111. In some embodiments, the first edge 213 can be located on the first side 205 of the travel plane 111 while the second edge 215 can be located on the second side 207 of the travel plane 111. In some embodiments, the second edge 215 can be spaced apart from the first edge 213 to define the delivery opening 211 through which the delivery tube 107 and/or the stream of molten material 105 can extend. In some embodiments, a width of the delivery opening 211 between the first edge 213 and the second edge 215 can be greater than a width of the delivery tube 107, such that the delivery tube 107 can extend through the delivery opening 211. With the delivery opening 211 larger than the delivery tube 107, the first edge 213 and the second edge 215 can be spaced a distance apart from the delivery tube 107, for example, with the first edge 213 and the second edge 215 not in contact with the delivery tube 107. In some embodiments, the first plate 201 and the second plate 203 can be angled relative to the travel plane 111. For example, the first plate 201 and the second plate 203 can form an angle relative to the travel plane 111 that may be between about 20 degrees to about 90 degrees.

The first plate 201 and the second plate 203 can be exposed to a relatively wide range of temperatures, for example, within a range from about 1000° C. to about 1400° C. While the first plate 201 and the second plate 203 may experience thermal deformation due to the temperature ranges that the first plate 201 and the second plate 203 are subjected to, it may be beneficial to reduce deformation of the first plate 201 and the second plate 203. In addition, or in the alternative, if deformation of the first plate 201 and the second plate 203 occurs, permanent thermal deformation of the first plate 201 and the second plate 203 can be avoided. For example, permanent thermal deformation may occur when a plate thermally deforms in response to an elevated temperature, but after the temperature drops, the plate does not return to the plate's original shape, but rather remains in the thermally deformed state or a partially thermally deformed state.

Figure 3:
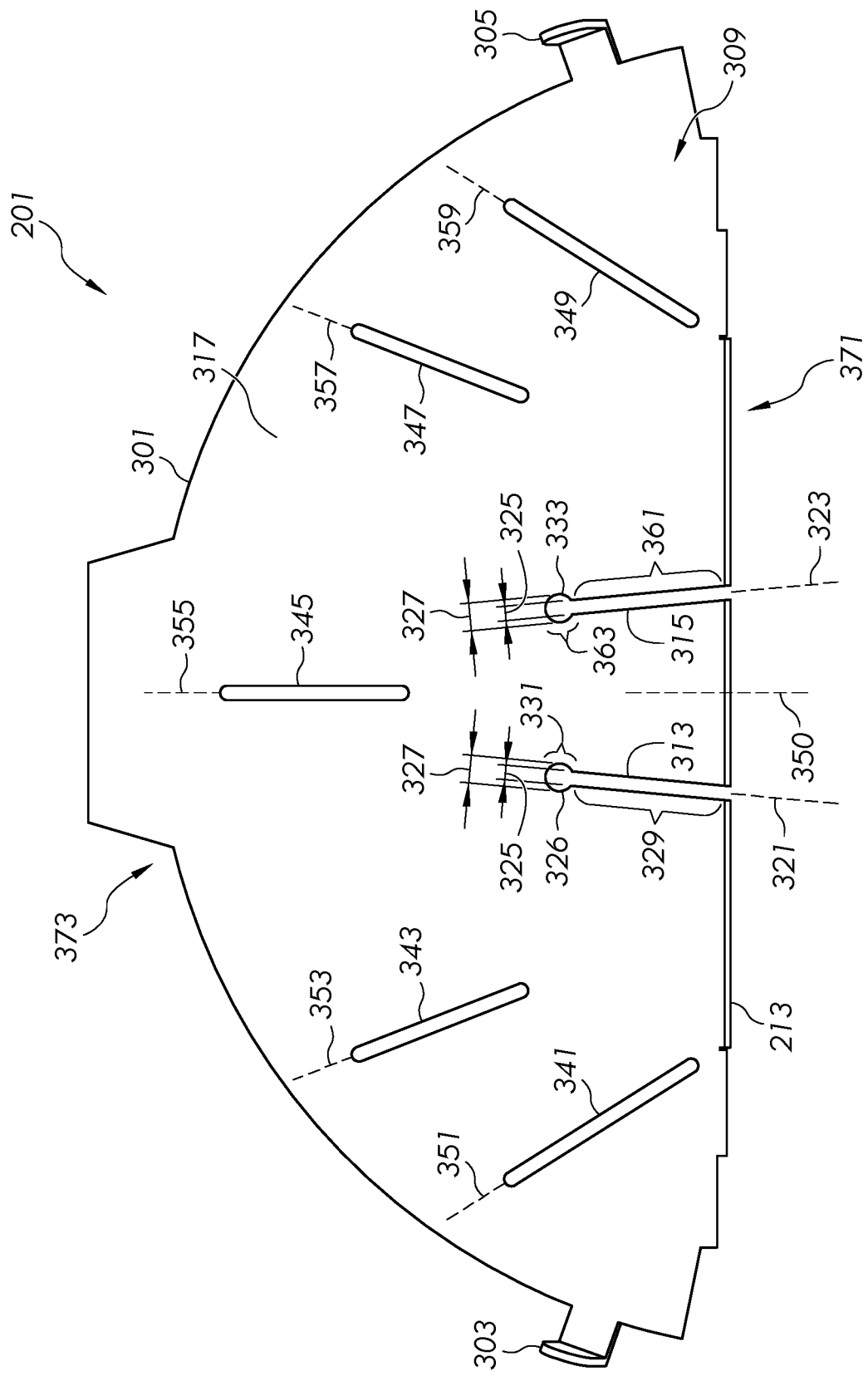
FIG. 3 illustrates a front view of example embodiments of the first plate of FIG. 2 in accordance with embodiments of the disclosure.

FIG. 3 illustrates a front view of an example of the first plate 201 (e.g., illustrated in FIG. 2) comprising the first edge 213. It will be appreciated that, in some embodiments, the first plate 201 may be substantially identical to the second plate 203 (e.g., illustrated in FIG. 2). In some embodiments, the first plate 201 can comprise a first opposing edge 301 that may be located opposite the first edge 213. The first edge 213 can extend substantially linearly, while the first opposing edge 301 can extend non-linearly and non-parallel to the first edge 213. For example, the first opposing edge 301 can comprise a rounded shape, such that the first plate 201 can comprise a semi-circular shape. The first opposing edge 301 is not limited to extending non-linearly as illustrated in FIG. 3. Rather, in some embodiments, the first opposing edge 301 can extend substantially linearly, such that the first plate 201 may comprise a quadrilateral shape (e.g., square, rectangle, etc.). In some embodiments, when the first opposing edge 301 extends substantially linearly, the first opposing edge 301 can extend substantially parallel to the first edge 213. In some embodiments, the first plate 201 can comprise one or more fastening structures, for example, a first fastening structure 303 and a second fastening structure 305. The first fastening structure 303 and the second fastening structure 305 can be coupled to opposing sides of the first opposing edge 301 (e.g., by being formed with, welded to, etc.) and may be configured to attach the first plate 201 to a structure. The first fastening structure 303 and the second fastening structure 305 can maintain a position of the first plate 201 relative to the delivery tube 107 (e.g., illustrated in FIG. 2). In some embodiments, the first fastening structure 303 and the second fastening structure 305 can comprise openings to receive fasteners, for example, screws, bolts, etc., to assist in fastening the first plate 201 and maintaining the position of the first plate 201.

In some embodiments, the first plate 201 can comprise one or more thermal expansion slots, for example, a first plurality of thermal expansion slots 309. The plurality of thermal expansion slots 309 may comprise openings, for example, voids, cavities, channels, passageways, hollow portions, etc., formed within the first plate 201. The first plurality of thermal expansion slots 309 can accommodate for thermal expansion of the first plate 201 when the first plate 201 is exposed to the elevated temperatures in proximity to the delivery tube 107. For example, the first plate 201 can expand and/or deform when exposed to these elevated temperatures. Due to the first plurality of thermal expansion slots 309, deformation of the first plate 201 may be minimized. In addition or in the alternative, when a temperature of the first plate 201 cycles between a high temperature (e.g., up to 1400° C.) and a low temperature (e.g., down to 1000° C.), the first plurality of thermal expansion slots 309 can facilitate a return of the first plate 201 from a deformed state to an original state while reducing the likelihood of permanent deformation. For example, the first plate 201 may not remain permanently in an expanded or deformed state after the temperature of the first plate 201 is reduced.

The first plate 201 can comprise a first thermal expansion slot 313 and a third thermal expansion slot 315. The first thermal expansion slot 313 and the third thermal expansion slot 315 can extend from the first edge 213 to a first interior 317 of the first plate 201, wherein the first interior 317 of the first plate 201 may be located inward from the first edge 213. In some embodiments, the first thermal expansion slot 313 and the third thermal expansion slot 315 can extend non-parallel relative to one another. For example, the first thermal expansion slot 313 can extend along a first slot axis 321 while the third thermal expansion slot 315 can extend along a third slot axis 323 that may be non-parallel relative to the first slot axis 321. By extending non-parallel to one another, in some embodiments, a distance separating the first slot axis 321 and the third slot axis 323 can decrease along a direction away from the first edge 213. In some embodiments, a width of the first thermal expansion slot 313 can vary. For example, at one location (e.g., a midpoint of the first thermal expansion slot 313 between opposing ends of the first thermal expansion slot 313), the first thermal expansion slot 313 can comprise a first width 325, while at another location (e.g., at a first inward end 326 of the first thermal expansion slot 313 opposite the first edge 213), the first thermal expansion slot 313 can comprise a second width 327 that may be different than the first width 325. In some embodiments, a central portion 329 of the first thermal expansion slot 313 can comprise the first width 325, which may be substantially constant from the first edge 213. An end portion 331 of the first thermal expansion slot 313 can comprise the second width 327, which may be larger than the first width 325. The end portion 331 can comprise a rounded, circular shape, comprising a diameter that matches the second width 327. In some embodiments, the third thermal expansion slot 315 can be substantially identical to the first thermal expansion slot 313 in size and shape, while extending from the first edge 213 to a third inward end 333. For example, the third thermal expansion slot 315 can comprise the first width 325 at a central portion 361 and the second width 327 at an end portion 363. The third thermal expansion slot 315 can comprise the substantially constant first width 325 from the first edge 213 to the end portion 363.

In some embodiments, the first plurality of thermal expansion slots 309 can comprise one or more interior thermal expansion slots. For example, the first plurality of thermal expansion slots 309 can comprise a first interior thermal expansion slot 341, a second interior thermal expansion slot 343, a third interior thermal expansion slot 345, a fourth interior thermal expansion slot 347, and a fifth interior thermal expansion slot 349. While the first plate 201 is illustrated as comprising five interior thermal expansion slots, in some embodiments, the first plate 201 can comprise zero or more interior thermal expansion slots. The interior thermal expansion slots 341, 343, 345, 347, 349 may be located within the first interior 317 of the first plate 201 and may be spaced a distance apart from the first edge 213 and the first opposing edge 301. In some embodiments, the interior thermal expansion slots 341, 343, 345, 347, 349 may extend non-parallel relative to one another. For example, the first interior thermal expansion slot 341 can extend linearly along a first interior axis 351. The second interior thermal expansion slot 343 can extend linearly along a second interior axis 353. The third interior thermal expansion slot 345 can extend linearly along a third interior axis 355. The fourth interior thermal expansion slot 347 can extend linearly along a fourth interior axis 357. The fifth interior thermal expansion slot 349 can extend linearly along a fifth interior axis 359. In some embodiments, the first interior axis 351, the second interior axis 353, the third interior axis 355, the fourth interior axis 357, and the fifth interior axis 359 can extend non-parallel to one another. In some embodiments, the third interior axis 355 can extend substantially perpendicular to the first edge 213. In some embodiments, the interior thermal expansion slots 341, 343, 345, 347, 349 can comprise substantially constant widths along a length of the interior thermal expansion slots 341, 343, 345, 347, 349. The interior thermal expansion slots 341, 343, 345, 347, 349 are not limited to extending substantially linearly along an axis, and in some embodiments, zero or more of the interior thermal expansion slots 341, 343, 345, 347, 349 can extend non-linearly, for example, by comprising one or more bends, curves, undulations, etc. In some embodiments, by extending non-parallel to one another, the interior thermal expansion slots 341, 343, 345, 347, 349 can minimize deformation of the first plate 201 when the first plate 201 is exposed to temperatures near the delivery tube 107.

In some embodiments, the first interior thermal expansion slot 341 and the fifth interior thermal expansion slot 349 can intersect a central axis 350 that bisects the first plate 201. For example, the first interior thermal expansion slot 341 and the fifth interior thermal expansion slot 349 can form the same angles relative to the central axis 350 while being located on opposing sides of the central axis 350, such that the first interior thermal expansion slot 341 may be a mirror image of the fifth interior thermal expansion slot 349. In some embodiments, the second interior thermal expansion slot 343 and the fourth interior thermal expansion slot 347 can intersect the central axis 350. For example, the second interior thermal expansion slot 343 and the fourth interior thermal expansion slot 347 can form the same angles relative to the central axis 350 while being located on opposing sides of the central axis 350, such that the second interior thermal expansion slot 343 may be a mirror image of the fourth interior thermal expansion slot 347. By forming some of the interior thermal expansion slots as mirror images of other thermal expansion slots, the first plate 201 can balance the bending and torsion stresses on opposing sides of the first plate 201 when the first plate 201 is heated. In some embodiments, the first interior thermal expansion slot 341, the second interior thermal expansion slot 343, the fourth interior thermal expansion slot 347, and the fifth interior thermal expansion slot 349 can be spaced a non-constant distance from the central axis 350. For example, a lower end of the first interior thermal expansion slot 341 can be closer to the central axis 350 than an opposing upper end of the first interior thermal expansion slot 341. In some embodiments, a lower end of the second interior thermal expansion slot 343 can be closer to the central axis 350 than an opposing upper end of the second interior thermal expansion slot 343. In some embodiments, a lower end of the fourth interior thermal expansion slot 347 can be closer to the central axis 350 than an opposing upper end of the fourth interior thermal expansion slot 347. In some embodiments, a lower end of the fifth interior thermal expansion slot 349 can be closer to the central axis 350 than an opposing upper end of the fifth interior thermal expansion slot 349. The third interior thermal expansion slot 345 can extend parallel to the central axis 350, for example, coaxially relative to the central axis 350. In some embodiments, the interior thermal expansion slots 341, 343, 345, 347, 349 can be arranged radially about the first plate 201.

The arrangement of the interior thermal expansion slots 341, 343, 345, 347, 349 can minimize deformation of the first plate 201 and reduce the likelihood of permanent deformation of the first plate 201. For example, a first side 371 of the first plate 201 (e.g., along which the first edge 213 extends) may comprise a greater surface area than a second side 373 of the first plate 201, which is opposite the first side 371. To accommodate for the greater surface area and, thus, greater deformation along the first edge 213 of the first plate 201, a larger proportion of the thermal expansion slots may be positioned near the first side 371 as opposed to the second side 373. For example, the first thermal expansion slot 313 and the third thermal expansion slot 315 may intersect the first edge 213 and extend inward from the first edge 213 towards the first interior 317. In some embodiments, the lower ends of the first interior thermal expansion slot 341 and the fifth interior thermal expansion slot 349 may be located in proximity to the first edge 213, though spaced apart from and not intersecting the first edge 213. The first thermal expansion slot 313, the third thermal expansion slot 315, the first interior thermal expansion slot 341, and the fifth interior thermal expansion slot 349 can therefore minimize thermal expansion of the first plate 201, for example, along the first side 371 of the first plate 201. Due to the rounded shape of the first opposing edge 301, the second side 373 of the first plate 201 may experience less thermal expansion than the first side 371, wherein the upper ends of the second interior thermal expansion slot 343, the third interior thermal expansion slot 345, and the fourth interior thermal expansion slot 347 may minimize thermal expansion of the first plate 201, for example, along the second side 373 of the first plate 201.

Figure 4:
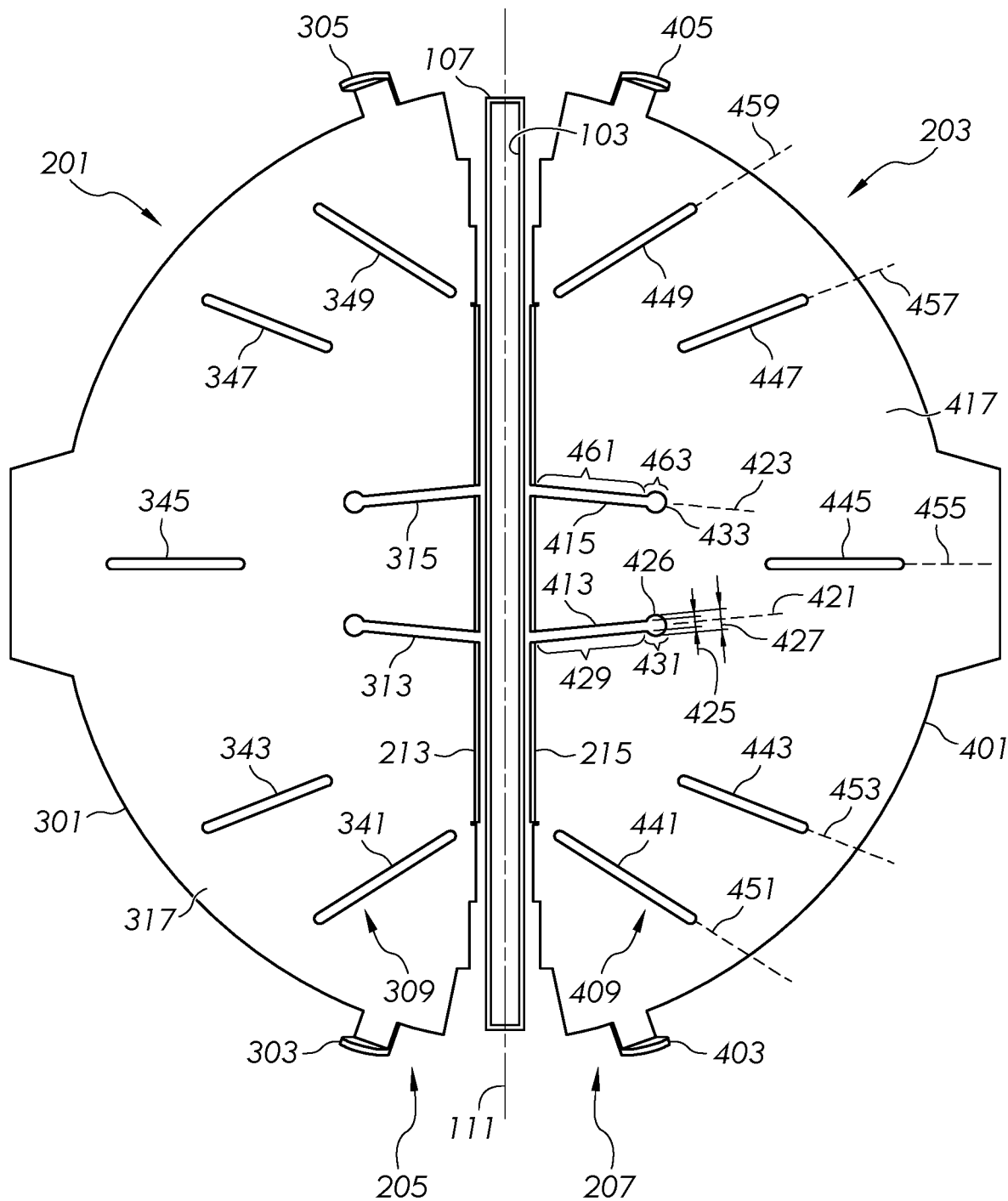
FIG. 4 illustrates a bottom view of example embodiments of a glass manufacturing apparatus along line 4-4 of FIG. 2 in accordance with embodiments of the disclosure.

FIG. 4 illustrates a bottom view of the first plate 201, the second plate 203, and the delivery tube 107 as viewed from the perspective indicated by line 4-4 of FIG. 2. In some embodiments, the second plate 203 can comprise a mirror image of the first plate 201 about the travel plane 111. In some embodiments, the first plate 201 can comprise the first edge 213 extending adjacent the travel plane 111, with the first plate 201 located on the first side 205 of the travel plane 111. The second plate 203 can comprise the second edge 215 extending adjacent the travel plane 111, with the second plate 203 located on the second side 207 of the travel plane 111. In some embodiments, the second plate 203 can be substantially identical to the first plate 201. For example, the second plate 203 can comprise a second opposing edge 401 that may be located opposite the second edge 215. The second edge 215 can extend substantially linearly (e.g., parallel to the travel plane 111 and the first edge 213), while the second opposing edge 401 can extend non-linearly and non-parallel to the second edge 215. For example, the second opposing edge 401 can comprise a rounded, semi-circular shape similar to the first opposing edge 301 of the first plate 201. In some embodiments, the second plate 203 can comprise one or more fastening structures, for example, a first fastening structure 403 and a second fastening structure 405. The first fastening structure 403 and the second fastening structure 405 of the second plate 203 may be substantially identical to the first fastening structure 303 and the second fastening structure 305, respectively, of the first plate 201. The first fastening structure 403 and the second fastening structure 405 can be attached to the second opposing edge 401 and may be configured to attach the second plate 203 to a structure to maintain a position of the second plate 203 relative to the delivery tube 107. In some embodiments, the first fastening structure 403 and the second fastening structure 405 can comprise openings to receive fasteners, for example, screws, bolts, etc., to assist in fastening the second plate 203.

In some embodiments, the second plate 203 can comprise a second plurality of thermal expansion slots 409 that may be substantially identical to the first plurality of thermal expansion slots 309 of the first plate 201. The second plurality of thermal expansion slots 409 can minimize thermal expansion of the second plate 203 when the second plate 203 is exposed to elevated temperatures in proximity to the delivery tube 107. For example, the second plate 203 can expand when exposed to these elevated temperatures, but, due to the second plurality of thermal expansion slots 409, deformation of the second plate 203 may be minimized. In addition, or in the alternative, when a temperature of the second plate 203 is reduced, the second plurality of thermal expansion slots 409 facilitates a return of the second plate 203 from a deformed state to an original state while reducing the likelihood of permanent deformation.

The second plate 203 can comprise a second thermal expansion slot 413 and a fourth thermal expansion slot 415. The second thermal expansion slot 413 can be substantially identical to the first thermal expansion slot 313 of the first plate 201. The fourth thermal expansion slot 415 can be substantially identical to the third thermal expansion slot 315 of the first plate 201. For example, the second thermal expansion slot 413 and the fourth thermal expansion slot 415 can extend from the second edge 215 to a second interior 417 of the second plate 203, wherein the second interior 417 of the second plate 203 may be located inward from the second edge 215. The second thermal expansion slot 413 and the fourth thermal expansion slot 415 can extend non-parallel relative to one another. For example, the second thermal expansion slot 413 can extend along a second slot axis 421 while the fourth thermal expansion slot 415 can extend along a fourth slot axis 423 that may be non-parallel relative to the second slot axis 421. By extending non-parallel to one another, a distance separating the second slot axis 421 and the fourth slot axis 423 can decrease along a direction away from the second edge 215. In some embodiments, a width of the second thermal expansion slot 413 can vary. For example, at one location (e.g., a midpoint of the second thermal expansion slot 413 between opposing ends of the second thermal expansion slot 413), the second thermal expansion slot 413 can comprise a first width 425, while at another location (e.g., at a second inward end 426 of the second thermal expansion slot 413 opposite the second edge 215), the second thermal expansion slot 413 can comprise a second width 427 that may be different than the first width 425. In some embodiments, a central portion 429 of the second thermal expansion slot 413 can comprise the first width 425, which may be substantially constant from the second edge 215. An end portion 431 of the second thermal expansion slot 413 can comprise the second width 427, which may be larger than the first width 425. The end portion 431 can comprise a rounded, circular shape, comprising a diameter that matches the second width 427. In some embodiments, the fourth thermal expansion slot 415 can be substantially identical to the first thermal expansion slot 313, the second thermal expansion slot 413, and the third thermal expansion slot 315 in size and shape. The fourth thermal expansion slot 415 may extend from the second edge 215 to a fourth inward end 433. For example, the fourth thermal expansion slot 415 can comprise the first width 425 at a central portion 461 and the second width 427 at an end portion 463. The fourth thermal expansion slot 415 can comprise the substantially constant first width 425 from the second edge 215 to the end portion 463.

In some embodiments, the second plurality of thermal expansion slots 409 can comprise one or more interior thermal expansion slots. For example, the second plurality of thermal expansion slots 409 can comprise a first interior thermal expansion slot 441, a second interior thermal expansion slot 443, a third interior thermal expansion slot 445, a fourth interior thermal expansion slot 447, and a fifth interior thermal expansion slot 449. The interior thermal expansion slots 441, 443, 445, 447, 449 of the second plate 203 may be substantially identical to the interior thermal expansion slots 341, 343, 345, 347, 349 of the first plate 201. For example, the interior thermal expansion slots 441, 443, 445, 447, 449 of the second plate 203 may extend non-parallel relative to one another. For example, the first interior thermal expansion slot 441 can extend along a first interior axis 451. The second interior thermal expansion slot 443 can extend along a second interior axis 453. The third interior thermal expansion slot 445 can extend along a third interior axis 455. The fourth interior thermal expansion slot 447 can extend along a fourth interior axis 457. The fifth interior thermal expansion slot 449 can extend along a fifth interior axis 459. In some embodiments, the first interior axis 451, the second interior axis 453, the third interior axis 455, the fourth interior axis 457, and the fifth interior axis 459 can extend non-parallel to one another. In some embodiments, the third interior axis 455 can extend substantially perpendicular to the second edge 215. In some embodiments, the interior thermal expansion slots 441, 443, 445, 447, 449 can comprise a substantially constant widths along a length of the interior thermal expansion slots 441, 443, 445, 447, 449.

Figure 5:
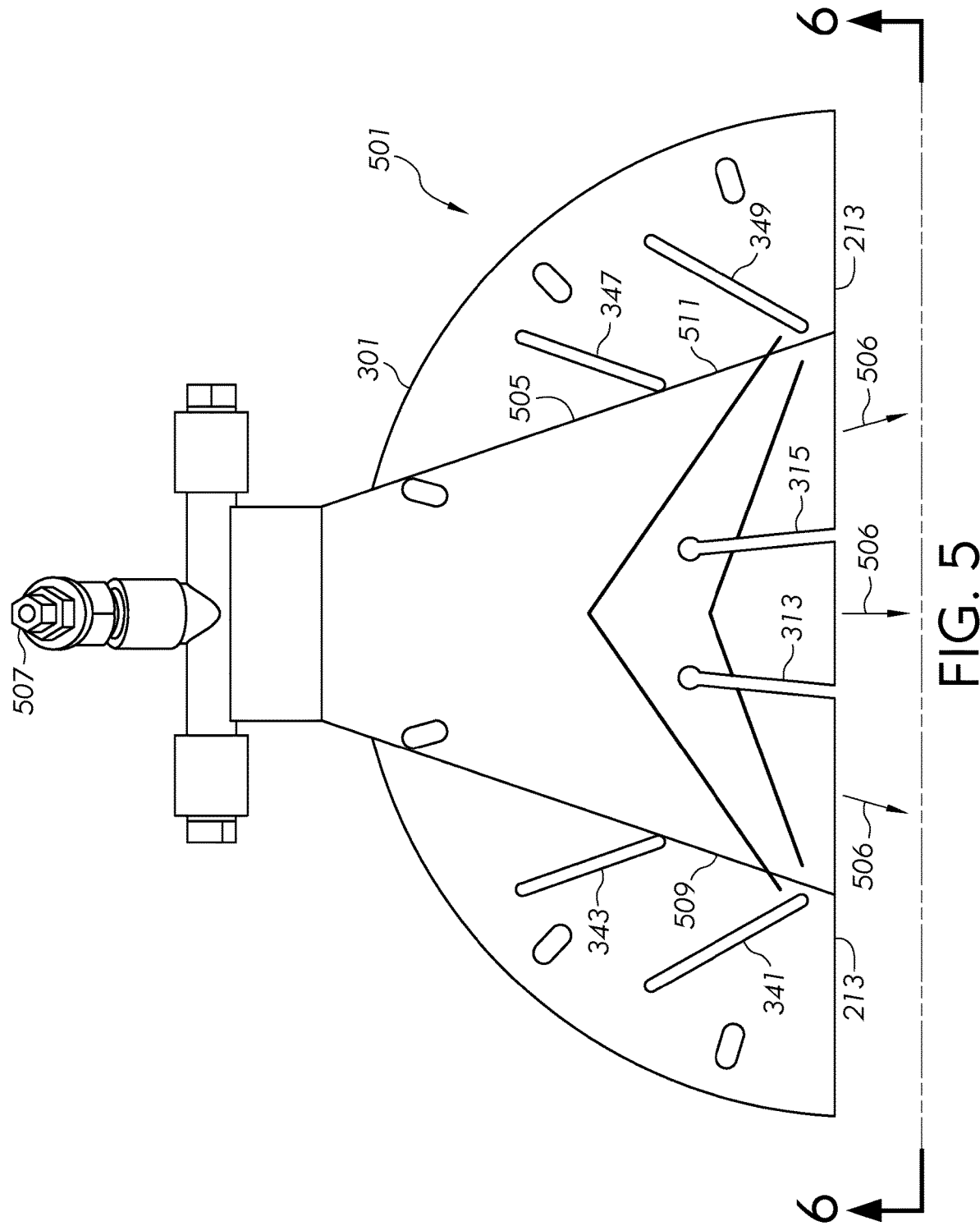
FIG. 5 illustrates a front view of additional embodiments of a first plate in accordance with embodiments of the disclosure.

FIG. 5 illustrates a front view of further embodiments of a first plate 501. The first plate 501 may be similar in some respects to the first plate 201 and the second plate 203 illustrated in FIGS. 2-4. For example, in some embodiments, the first plate 501 can comprise zero or more of the first thermal expansion slot 313, the third thermal expansion slot 315, the first interior thermal expansion slot 341, the second interior thermal expansion slot 343, the fourth interior thermal expansion slot 347, or the fifth interior thermal expansion slot 349. The first plate 501 can comprise the first edge 213, which can face the delivery tube 107 (e.g., illustrated in FIG. 6), and the first opposing edge 301. In some embodiments, the first plate 501 can comprise a first passage 505 (e.g., with the first passage 505 also illustrated in FIG. 6) that may be configured to direct a first gas flow 506 towards the travel plane 111 (e.g., illustrated in FIG. 6). For example, the first passage 505 can comprise an opening that extends through the first plate 501 through which the first gas flow 506 can pass. In some embodiments, the first passage 505 may be coupled to a first gas source 507, for example, with the first passage 505 in fluid communication with the first gas source 507. The first gas source 507 can deliver gas (e.g., the first gas flow 506) to the first passage 505, wherein the first gas flow 506 can flow through the first passage 505 and can exit at the first edge 213. The gas that is supplied by the first gas source 507 can comprise, for example, nitrogen, oxygen, mixtures thereof, etc.

Figure 6:
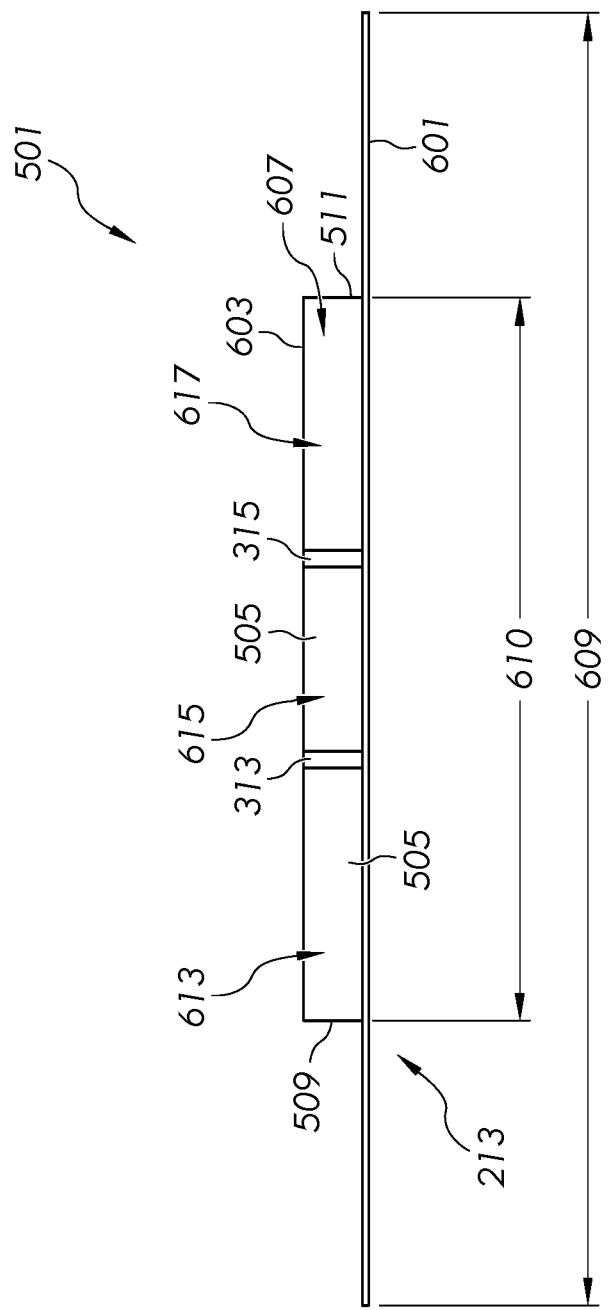
FIG. 6 illustrates an end view of example embodiments of the first plate along line 6-6 of FIG. 5 in accordance with embodiments of the disclosure.

Referring to FIGS. 5-6, the first plate 501 can comprise one or more walls, for example, a first wall 509 and a second wall 511. The first wall 509 and the second wall 511 can extend between the first edge 213 and the first opposing edge 301 of the first plate 501. In some embodiments, the first wall 509 and the second wall 511 can define opposing sides of the first passage 505. For example, the first wall 509 and the second wall 511 can be spaced apart and may comprise a non-constant spaced apart distance from the first edge 213 towards the first opposing edge 301. For example, a distance between the first wall 509 and the second wall 511 at the first edge 213 may be greater than a distance between the first wall 509 and the second wall 511 at the first opposing edge 301. The distance between the first wall 509 and the second wall 511 may therefore decrease along a direction from the first edge 213 towards the first opposing edge 301. In some embodiments, the distance between the first wall 509 and the second wall 511 may comprise a maximum at the first edge 213 and a minimum at the first opposing edge 301.

FIG. 6 illustrates an end view of the first plate 501 facing the first edge 213 as viewed from the perspective indicated by line 6-6 of FIG. 5. In some embodiments, the first plate 501 can comprise a first plate layer 601 and a second plate layer 603 attached to the first plate layer 601. The first plate layer 601 can be spaced apart from the second plate layer 603 to form the first passage 505 between the first plate layer 601 and the second plate layer 603. In some embodiments, the first wall 509 and the second wall 511 can extend between the first plate layer 601 and the second plate layer 603 of the first plate 501. For example, the first plate layer 601 and the second plate layer 603 can extend substantially parallel to one another with the first plate layer 601 spaced apart from the second plate layer 603. In some embodiments, the first passage 505 may be defined between the first plate layer 601 and the second plate layer 603, and between the first wall 509 and the second wall 511. The first plate layer 601 and the second plate layer 603 can be directly attached to one another, for example, by being in contact with one another, or may be indirectly attached to each other, for example, with one or more intervening walls located in between. For example, in some embodiments, one end of the first wall 509 can be attached to the first plate layer 601 while an opposing end of the first wall 509 can be attached to the second plate layer 603. In some embodiments, one end of the second wall 511 can be attached to the first plate layer 601 while an opposing end of the second wall 511 can be attached to the second plate layer 603. The first wall 509 and the second wall 511 can be attached to the first plate layer 601 and the second plate layer 603 in several ways, for example, by welding, adhesives, being one-piece formed, etc. The first plate layer 601 can therefore be attached to the second plate layer 603 via the first wall 509 being attached to the first plate layer 601 and the second plate layer 603, and the second wall 511 being attached to the first plate layer 601 and the second plate layer 603.

In some embodiments, the first passage 505 can terminate at a first elongated orifice 607 extending along at least a portion of a length 609 of the first edge 213. For example, in some embodiments, the first elongated orifice 607 may extend along less than all of the length 609 of the first edge 213 of the first plate layer 601, such that the length 609 of the first plate layer 601 along the first edge 213 may be greater than a length 610 of the first elongated orifice 607. The first elongated orifice 607 may be positioned towards a center of the first plate layer 601 to concentrate the first gas flow 506 (e.g., illustrated in FIG. 5) towards a center of the stream of molten material 105. In some embodiments, the first elongated orifice 607 may be interrupted (e.g., non-consecutive) between the first wall 509 and the second wall 511. For example, when the first plate 501 comprises the first thermal expansion slot 313 and the third thermal expansion slot 315, the first elongated orifice 607 may be interrupted between the first wall 509 and the second wall 511 by the first thermal expansion slot 313 and the third thermal expansion slot 315. In some embodiments, the first elongated orifice 607 may comprise a first sub-orifice 613, a second sub-orifice 615, and a third sub-orifice 617. The first sub-orifice 613 may be positioned between the first wall 509 and the first thermal expansion slot 313. The second sub-orifice 615 may be positioned between the first thermal expansion slot 313 and the third thermal expansion slot 315. The third sub-orifice 617 may be positioned between the third thermal expansion slot 315 and the second wall 511. The first gas flow 515 (e.g., illustrated in FIG. 5) can flow through first passage 505 and may exit the first plate 501 through the first sub-orifice 613, the second sub-orifice 615, and the third sub-orifice 617.

Figure 7:
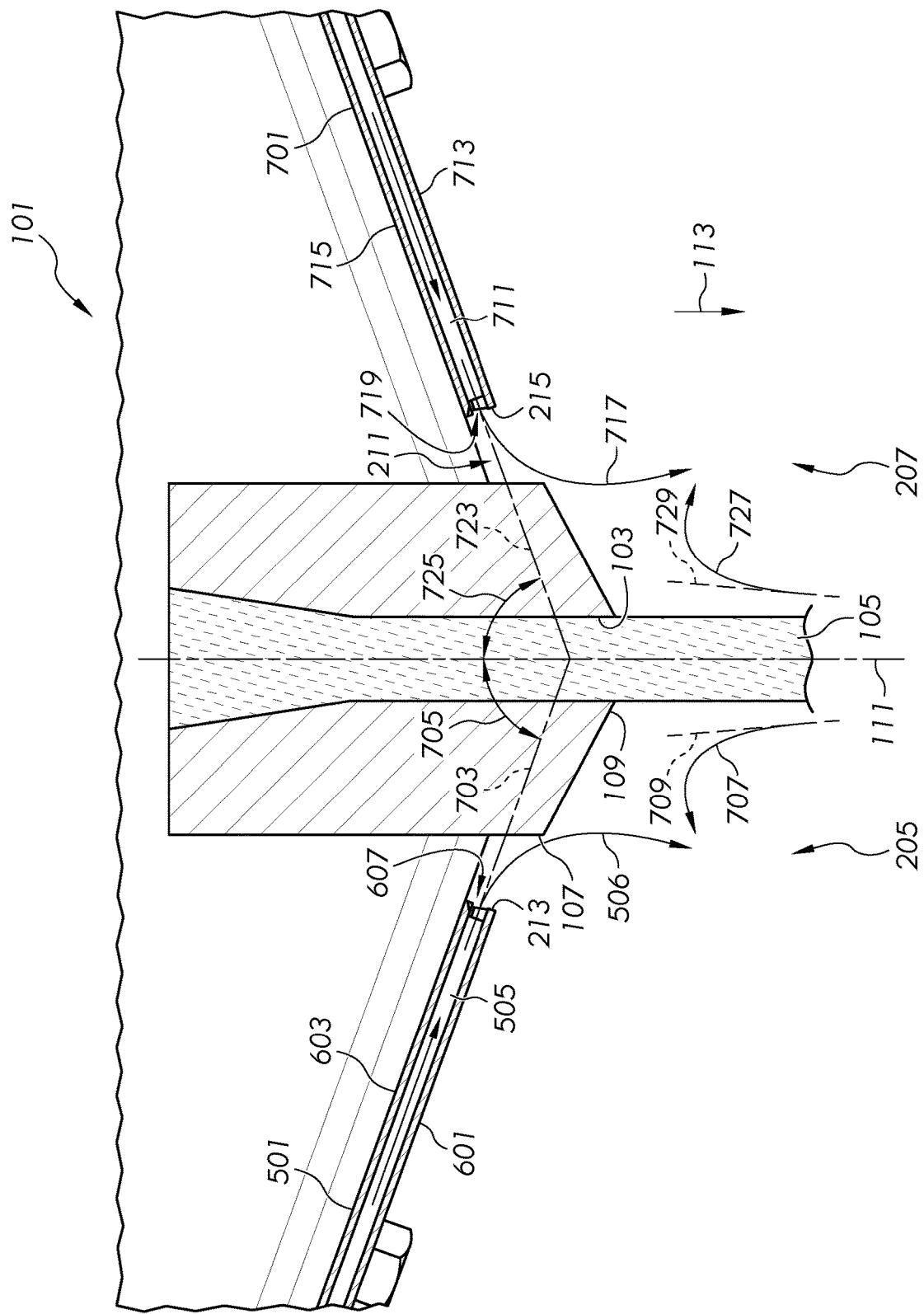
FIG. 7 illustrates an enlarged portion of the glass manufacturing apparatus comprising the first plate of FIGS. 5-6 and a second plate in accordance with embodiments of the disclosure.

FIG. 7 illustrates an enlarged, sectional side view of a bottom of the supply vessel 101 taken at view 2 of FIG. 1. In some embodiments, the supply vessel 101 can comprise the first plate 501 (e.g., also illustrated in FIGS. 5-6) and a second plate 701. The first plate 501 and the second plate 701 can be positioned in substantially the same positions as the first plate 201 and the second plate 203 illustrated in FIG. 2. For example, the first plate 501 can be positioned adjacent the lower end 109 of the delivery tube 107 on the first side 205 of the travel plane 111. The second plate 701 can be positioned adjacent the lower end 109 of the delivery tube 107 on the second side 207 of the travel plane 111. For example, in some embodiments, the delivery tube 107 and the stream of molten material 105 can extend between the first plate 501 and the second plate 701. The first plate 501 and the second plate 701 can be spaced apart to form the delivery opening 211 therebetween, with one or more of the delivery tube 107 or the stream of molten material 105 extending through the delivery opening 211. In some embodiments, the delivery tube 107 can extend through the delivery opening 211 such that the lower end 109 of the delivery tube 107 is located below the first plate 501 and the second plate 701.

The first plate 501 can comprise the first edge 213 extending adjacent the travel plane 111, and the first passage 505 can direct the first gas flow 506 from the first edge 213 towards the travel plane 111. In some embodiments, the first plate 501 can be oriented such that the first elongated orifice 607 can face the delivery tube 107. The first gas flow 506 can pass through the first passage 505 and exit the first elongated orifice 607, whereupon the first gas flow 506 can flow towards the travel plane 111. In some embodiments, the first passage 505 can extend along a first axis 703 that intersects the travel plane 111. The first axis 703 can define a first angle 705 relative to the travel plane 111 that may be within a range from about 20 degrees to about 70 degrees. For example, as the first gas flow 506 exits the first elongated orifice 607, the first gas flow 506 can flow along the first axis 703. The first gas flow 506 can be directed downwards, for example, at least partially along the travel direction 113. In some embodiments, the first edge 213 can be spaced a distance apart from the delivery tube 107, such that the first gas flow 506 can travel a distance from the first elongated orifice 607 towards the delivery tube 107 before impinging upon the delivery tube 107.

In some embodiments, as the stream of molten material 105 exits the delivery slot 103 and travels along the travel direction 113, a first released gas 707 can be released from the stream of molten material 105. The first released gas 707 can be generated, for example, due to the air temperature near the delivery slot 103 being less than a temperature of the steam of molten material 105. In some embodiments, when the first released gas 707 contacts the delivery tube 107, condensation may be formed at the delivery tube 107. It may therefore be beneficial to limit the contact of the first released gas 707 and the delivery tube 107, for example, by redirecting the flow of the first released gas 707 along a direction away from the delivery tube 107. For example, the first released gas 707 may initially travel upwardly (e.g., opposite the travel direction 113) towards the delivery tube 107. In some embodiments, the first gas flow 506 traveling along the first axis 703 from the first elongated orifice 607 can intersect a first path 709 along which the first released gas 707 travels opposite the travel direction 113 towards the delivery tube 107. The first gas flow 506 can redirect the first released gas 707 and cause the first released gas 707 to no longer travel along the first path 709. Rather, the first gas flow 506 can cause the first released gas 707 to travel away from the delivery tube 107, thus limiting the contact between the first released gas 707 and the delivery tube 107 and the formation of condensation at the delivery tube 107.

In some embodiments, the second plate 701 can be substantially identical to the first plate 501. For example, the second plate 701 can comprise the second edge 215 extending adjacent the travel plane 111, with the second plate 701 located on the second side 207 of the travel plane 111. The second edge 215 can be spaced apart from the first edge 213 to define the delivery opening 211 through which the delivery tube 107 extends. The second plate 701 can comprise zero or more of the thermal expansion slots illustrated in FIG. 5, for example, the first thermal expansion slot 313, the third thermal expansion slot 315, the first interior thermal expansion slot 341, the second interior thermal expansion slot 343, the fourth interior thermal expansion slot 347, or the fifth interior thermal expansion slot 349. In some embodiments, the second plate 701 can comprise a third plate layer 713 and a fourth plate layer 715 that may be spaced apart to form a second passage 711 between the third plate layer 713 and the fourth plate layer 715. In some embodiments, the third plate layer 713 and the fourth plate layer 715 may be substantially identical to the first plate layer 601 and the second plate layer 603, respectively, of the first plate 501. For example, the third plate layer 713 can be spaced apart from the fourth plate layer 715. In some embodiments, the second plate 701 can comprise the second passage 711 that may be configured to direct a second gas flow 717 towards the travel plane 111, for example, from the second edge 215 towards the travel plane 111. The second passage 711 can terminate at a second elongated orifice 719 extending along at least a portion of a length of the second edge 215. The second passage 711 can be coupled to a second gas source (e.g., substantially identical to the first gas source 507).

In some embodiments, the second plate 701 can be oriented such that the second elongated orifice 719 can face the delivery tube 107. The second gas flow 717 can pass through the second passage 711 and exit the second elongated orifice 719, whereupon the second gas flow 717 can flow towards the travel plane 111. In some embodiments, the second passage 711 can extend along a second axis 723 that intersects the travel plane 111. The second axis 723 can define a second angle 725 relative to the travel plane 111 that may be within a range from about 20 degrees to about 70 degrees. For example, as the second gas flow 717 exits the second elongated orifice 719, the second gas flow 717 can flow along the second axis 723. The second gas flow 717 can be directed downwards, for example, at least partially along the travel direction 113. In some embodiments, the second edge 215 can be spaced a distance apart from the delivery tube 107, such that the second gas flow 717 can travel a distance from the second elongated orifice 719 towards the delivery tube 107 before impinging upon the delivery tube 107.

In some embodiments, as the stream of molten material 105 exits the delivery slot 103 and travels along the travel direction 113, a second released gas 727 can be released from the stream of molten material 105. The second released gas 727 can be generated, for example, similar to the first released gas 707 due to the air temperature near the delivery slot 103 being less than a temperature of the steam of molten material 105. The first released gas 707 may travel along the first side 205 of the travel plane 111 while the second released gas 727 may travel along the second side 207 of the travel plane 111. The second released gas 727 may initially travel upwardly (e.g., opposite the travel direction 113) towards the delivery tube 107. In some embodiments, the second gas flow 717 traveling along the second axis 723 from the second elongated orifice 719 can intersect a second path 729 along which the second released gas 727 travels opposite the travel direction 113 towards the delivery tube 107. The second gas flow 717 can redirect the second released gas 727 and cause the second released gas 727 to no longer travel along the second path 729. Rather, the second gas flow 717 can cause the second released gas 727 to travel away from the delivery tube 107, thus limiting the contact between the second released gas 727 and the delivery tube 107 and the formation of condensation at the delivery tube 107.

Figure 8:
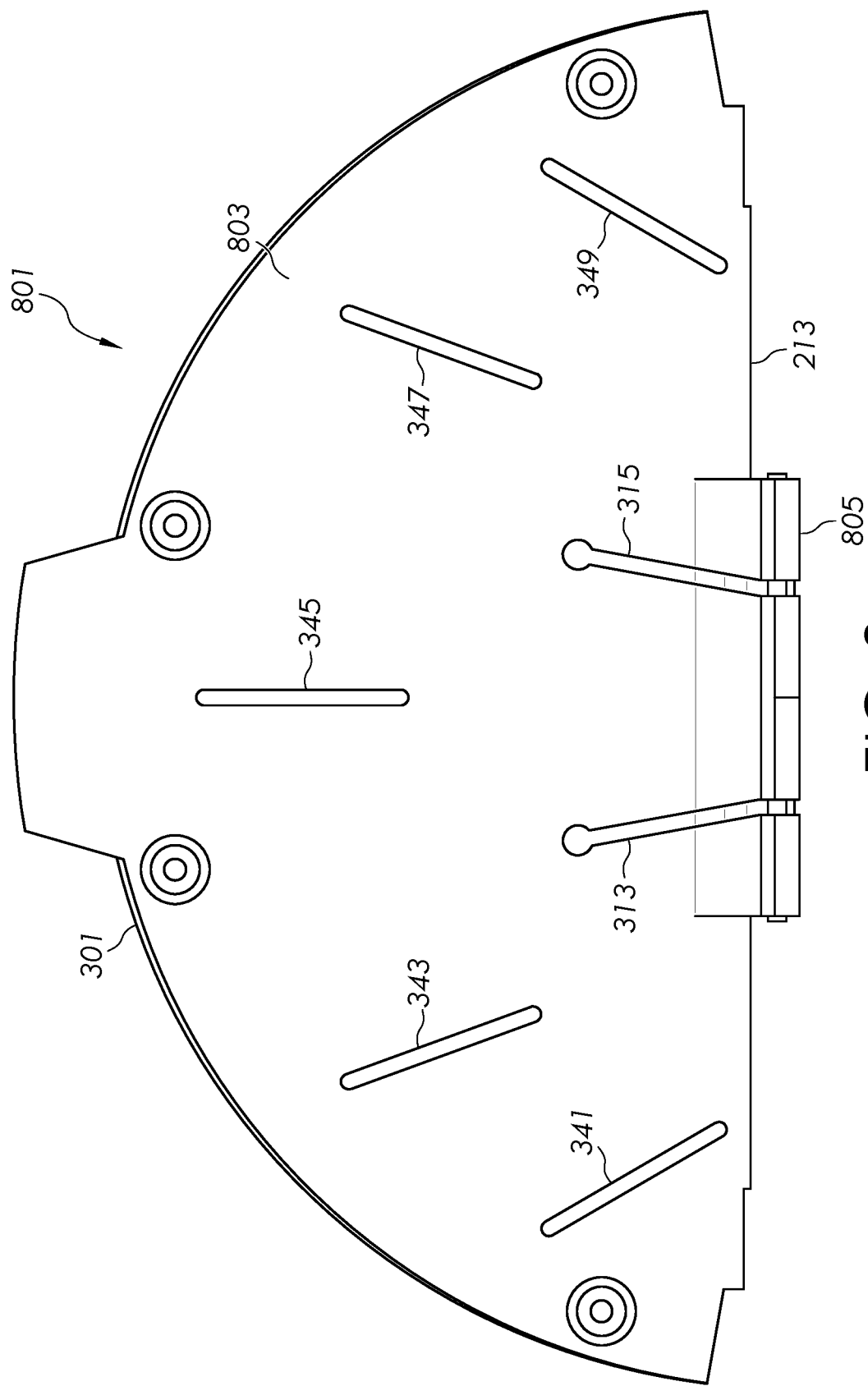
FIG. 8 illustrates a front view of yet additional embodiments of a first plate in accordance with embodiments of the disclosure.

FIG. 8 illustrates a front view of further embodiments of a first plate 801. The first plate 801 may be similar in some respects to the first plate 201 and the second plate 203 illustrated in FIGS. 2-4, and the first plate 501 and the second plate 701 illustrated in FIGS. 5-7. For example, in some embodiments, the first plate 801 can comprise zero or more of the first thermal expansion slot 313, the third thermal expansion slot 315, the first interior thermal expansion slot 341, the second interior thermal expansion slot 343, the third interior thermal expansion slot 345, the fourth interior thermal expansion slot 347, or the fifth interior thermal expansion slot 349. The first plate 801 can comprise the first edge 213, which can face the delivery tube 107, and the first opposing edge 301.

In some embodiments, the first plate 801 can comprise a first electrically conductive layer 803 and a first electrically isolating member 805. The first electrically conductive layer 803 can form the body of the first plate 801, while the first electrically isolating member 805 can extend along the first edge 213 of the first plate 801. In some embodiments, to maintain a target temperature near the delivery tube 107 (e.g., illustrated in FIG. 9), electric current can pass through the first electrically conductive layer 803, which can generate heat. The first electrically conductive layer 803 can comprise several different electrically conductive materials, for example, metal materials such as platinum. In some embodiments, to reduce the likelihood of the first electrically conductive layer 803 contacting the delivery tube 107, the first electrically isolating member 805 can be attached to the first electrically conductive layer 803. For example, the first electrically isolating member 805 can be positioned on at least a portion of the first edge 213 of the first plate 801 and can electrically isolate the first electrically conductive layer 803 from the delivery tube 107. The first electrically isolating member 805 can comprise several different electrically isolating materials, for example, a ceramic material. In some embodiments, the first electrically isolating member 805 can comprise an electrical resistance from about $10^9$ ohms to about $10^{13}$ ohms. While the first electrically isolating member 805 is illustrated as being positioned towards a center of the first edge 213, in some embodiments, the first electrically isolating member 805 can extend along less than or all of the length of the first edge 213.

Figure 9:
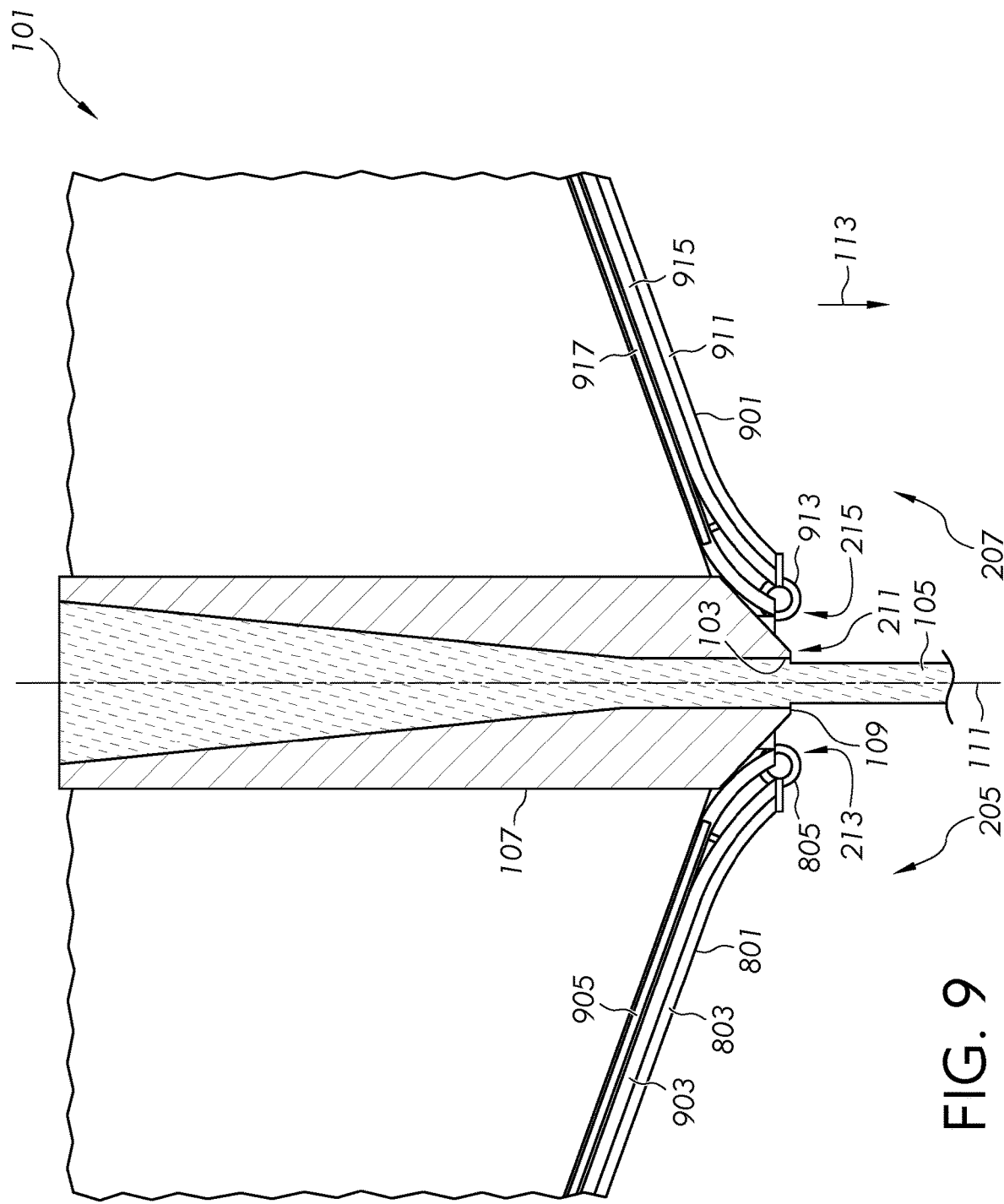
FIG. 9 illustrates an enlarged portion of the glass manufacturing apparatus comprising the first plate of FIG. 8 and a second plate in accordance with embodiments of the disclosure.

FIG. 9 illustrates an enlarged, side view of a bottom of the supply vessel 101 taken at view 2 of FIG. 1. In some embodiments, the supply vessel 101 can comprise the first plate 801 (e.g., also illustrated in FIG. 8) and a second plate 901. The first plate 801 and the second plate 901 can be positioned in substantially the same positions as the first plate 201 and the second plate 203 (e.g., illustrated in FIG. 2) and the first plate 501 and the second plate 701 (e.g., illustrated in FIG. 7). For example, the first plate 801 can be positioned adjacent the lower end 109 of the delivery tube 107 on the first side 205 of the travel plane 111. The second plate 901 can be positioned adjacent the lower end 109 of the delivery tube 107 on the second side 207 of the travel plane 111. For example, in some embodiments, the delivery tube 107 and the stream of molten material 105 can extend between the first plate 801 and the second plate 901. The first plate 801 and the second plate 901 can be spaced apart to form the delivery opening 211 therebetween, with one or more of the delivery tube 107 or the stream of molten material 105 extending through the delivery opening 211. In some embodiments, the delivery tube 107 can extend through the delivery opening 211 such that the lower end 109 of the delivery tube 107 may be located below the first plate 501 and the second plate 701.

The first plate 801 can comprise the first edge 213 extending adjacent the travel plane 111. In some embodiments, the first plate 801 can comprise the first electrically conductive layer 803 and a first thermally insulating layer 903 attached to the first electrically conductive layer 803. The thermally insulating layer 903 can comprise several materials that can reduce heat transfer and maintain a temperature of the stream of molten material 105, for example, an alumina material (e.g., alumina paper). The first thermally insulating layer 903 can be attached to an upper side of the first electrically conductive layer 803 in several ways, for example, with adhesives, such that relative movement between the first electrically conductive layer 803 and the first thermally insulating layer 903 may be limited. In some embodiments, the first thermally insulating layer 903 may comprise a plurality of thermally insulating layers, for example, a second thermally insulating layer 905, etc. The plurality of thermally insulating layers can be attached to one another and to the upper side of the first electrically conductive layer 803. In some embodiments, the first electrically isolating member 805 can be attached to one or more of the first electrically conductive layer 803 or the first thermally insulating layer 903. In some embodiments, the first thermally insulating layer 903 can comprise a thermal conductivity within a range from about 0.05 Watts/meter-kelvin to about 0.17 Watts/meter-kelvin.

In some embodiments, the second plate 901 can be substantially identical to the first plate 801. For example, the second plate 901 can comprise the second edge 215 extending adjacent the travel plane 111, with the second plate 901 located on the second side 207 of the travel plane 111. The second edge 215 can be spaced apart from the first edge 213 to define the delivery opening 211 through which the stream of molten material 105 passes. The second plate 901 can comprise zero or more of the thermal expansion slots illustrated in FIG. 8, for example, the first thermal expansion slot 313, the third thermal expansion slot 315, the first interior thermal expansion slot 341, the second interior thermal expansion slot 343, the third interior thermal expansion slot 345, the fourth interior thermal expansion slot 347, or the fifth interior thermal expansion slot 349. In some embodiments, the second plate 901 can comprise a second electrically conductive layer 911 and a second electrically isolating member 913. The second electrically conductive layer 911 can be substantially identical to the first electrically conductive layer 803, while the second electrically isolating member 913 can be substantially identical to the first electrically isolating member 805. For example, the second electrically conductive layer 911 can form the body of the second plate 901, while the second electrically isolating member 913 can extend along the second edge 215 of the second plate 901. In some embodiments, to maintain a target temperature near the delivery tube 107, electric current can pass through the second electrically conductive layer 911, which can generate heat. The second electrically conductive layer 911 can comprise several different electrically conductive materials, for example, metal materials such as platinum. In some embodiments, to reduce the likelihood of the second electrically conductive layer 911 contacting the delivery tube 107, the second electrically isolating member 913 can be attached to the second electrically conductive layer 911. For example, the second electrically isolating member 913 can be positioned on at least a portion of the second edge 215 of the second plate 901 and can electrically isolate the second electrically conductive layer 911 from the delivery tube 107. The second electrically isolating member 913 can comprise several different electrically isolating materials, for example, a ceramic material. The second electrically isolating member 913 can extend along some or all of the length of the second edge 215.

In some embodiments, the second plate 901 can comprise the second electrically conductive layer 911 and a second thermally insulating layer 915 attached to the second electrically conductive layer 911. The second thermally insulating layer 915 can be substantially identical to the first thermally insulating layer 903. For example, the second thermally insulating layer 915 can comprise several materials that can reduce heat transfer and maintain a temperature of the stream of molten material 105, for example, an alumina material (e.g., alumina paper). The second thermally insulating layer 915 can be attached to an upper side of the second electrically conductive layer 911 in several ways, for example, with adhesives, such that relative movement between the second electrically conductive layer 911 and the second thermally insulating layer 915 may be limited. In some embodiments, the second thermally insulating layer 915 may comprise a plurality of thermally insulating layers, for example, a third thermally insulating layer 917, etc. The plurality of thermally insulating layers can be attached to one another and to the upper side of the second electrically conductive layer 911. In some embodiments, the second electrically isolating member 913 can be attached to one or more of the second electrically conductive layer 911 or the second thermally insulating layer 915.

In some embodiments, as the stream of molten material 105 exits the delivery slot 103 and travels along the travel direction 113, the first plate 801 and the second plate 901 can facilitate a constant temperature of the stream of molten material 105 along a direction that is parallel to the travel plane 111 and perpendicular to the travel direction 113. For example, temperature variations within the stream of molten material 105 may occur along the direction that is parallel to the travel plane 111 and perpendicular to the travel direction 113, for example, with a temperature towards a center of the stream of molten material 105 lower than a temperature towards edges of the stream of molten material 105. Due to the first plate 801 and the second plate 901 comprising the plurality of thermally insulating layers 903, 905, 915, 917, heat loss from the delivery tube 107 and/or the stream of molten material 105 can be limited. In addition, in some embodiments, the first electrically conductive layer 803 and the second electrically conductive layer 911 can generate heat due to electrical current passing through the first electrically conductive layer 803 and the second electrically conductive layer 911. This heat generation can further assist in controlling a temperature of the stream of molten material 105. In some embodiments, the risk of inadvertent contact between the first electrically conductive layer 803 and/or the second electrically conductive layer 911 and the delivery tube 107 may be reduced. For example, the first plate 801 comprises the first electrically isolating member 805, which can electrically isolate the first electrically conductive layer 803 from the delivery tube 107. The second plate 901 can comprise the second electrically isolating member 913, which can electrically isolate the second electrically conductive layer 911 from the delivery tube 107. For example, during installation of the first plate 801 and the second plate 901, the delivery tube 107 may comprise an electrically conductive material through which current may pass, such that it may be beneficial to electrically isolate the first plate 801 and the second plate 901 from the delivery tube 107 with the electrically isolating members 805, 913.

In some embodiments, to further control the temperature of the stream of molten material 105, an external heat source can be attached to the first plate 801 and/or the second plate 901. For example, in some embodiments, the external heat source can be used in place of the first electrically isolating member 805 and/or the second electrically isolating member 913, such that the external heat source can replace the first electrically isolating member 805 at the first edge 213 of the first plate 801 and/or the second electrically isolating member 913 at the second edge 215 of the second plate 901. In some embodiments, the external heat source can comprise an electrically conductive wire (e.g., e.g., a metal coil) surrounded by a tube. The tube can comprise, for example, an inner surface comprising an electrically isolating material (e.g., ceramic) and an outer surface comprising an electrically conductive material (e.g., platinum). In some embodiments, the external heat source can generate heat, which can maintain a temperature of the stream of molten material 105 along the direction that may be parallel to the travel plane 111 and perpendicular to the travel direction 113.

In some embodiments, the glass manufacturing apparatus 100 can provide several benefits associated with manufacturing the ribbon 123 from the stream of molten material 105. For example, the glass manufacturing apparatus 100 can comprise the first plate 201, 501, 801 and the second plate 203, 701, 901 positioned adjacent the lower end 109 of the delivery tube 107. The first plate 201, 501, 801 and the second plate 203, 701, 901 can be exposed to a relatively wide range of temperatures (e.g., within a range from about 1000° C. to about 1400° C.). The first plate 201, 501, 801 and the second plate 203, 701, 901 can comprise the plurality of thermal expansion slots 313, 315, 341, 343, 345, 347, 349, which can reduce the amount of thermal expansion that the first plate 201, 501, 801 and the second plate 203, 701, 901 experience. In addition, if the first plate 201, 501, 801 and/or the second plate 203, 701, 901 experience thermal expansion as a result of a temperature increase, the first plate 201, 501, 801 and/or the second plate 203, 701, 901 may not be permanently deformed, but, rather, may return to a non-deformed shape when the temperature drops.

In addition, or in the alternative, in some embodiments, the first plate 501 and the second plate 701 can comprise the passages 505, 711 through which the gas flow 506, 717 can pass towards the delivery tube 107 and/or the stream of molten material 105. For example, gas (e.g., nitrogen, oxygen, etc.) can be supplied to the first plate 501 and the second plate 701 and may flow through the passages 505, 711. The gas flow 506, 717 can exit the first plate 501 and the second plate 701, and can redirect some, or all, of the released gas 707, 727 away from the delivery tube 107. Due to some, or all, of the released gas 707, 727 being redirected and not contacting the delivery tube 107, the formation of condensation on the delivery tube 107, which may be caused by the released gas 707, 727 flowing upwardly and contacting the delivery tube 107, may be limited. By limiting the formation of condensation on the delivery tube 107, the frequency of maintenance and/or downtime (e.g., to remove the condensation and/or effects caused by condensation) may be reduced. In addition, or in the alternative, in some embodiments, the first plate 801 and the second plate 901 can comprise the electrically conductive layers 803, 911, the thermally insulating layers 903, 915, and the electrically isolating members 805, 913. The thermally insulating layers 903, 915 can reduce heat loss from the stream of molten material 105, while the electrically conductive layers 803, 911 can generate heat. In some embodiments, the electrically isolating members 805, 913 can electrically isolate the first plate 801 and the second plate 901 from the delivery tube 107, which can reduce, for example, electrical arcing.

As used herein the terms "the," "a," or "an," mean "one or more," and should not be limited to "only one" unless explicitly indicated to the contrary. Thus, for example, reference to "a component" includes embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

As used herein, the terms "comprising" and "including," and variations thereof shall be construed as synonymous and open-ended, unless otherwise indicated.

While various embodiments have been described in detail relative to certain illustrative and specific embodiments thereof, the present disclosure should not be considered limited to such, as numerous modifications and combinations of the disclosed features are envisioned without departing from the scope of the following claims.

What is claimed is:

1. A glass manufacturing apparatus comprising:
a delivery tube terminating at a lower end in a delivery slot, the delivery tube configured to deliver a stream of molten material through the delivery slot along a travel plane in a travel direction to a forming apparatus;
a first plate positioned adjacent the lower end of the delivery tube on a first side of the travel plane, the first plate comprising a first edge extending adjacent the travel plane and a first thermal expansion slot extending from the first edge to a first interior of the first plate; and
a second plate positioned adjacent the lower end of the delivery tube on a second side of the travel plane, the second plate comprising a second edge extending adjacent the travel plane and a second thermal expansion slot extending from the second edge to a second interior of the second plate, the second edge spaced apart from the first edge to define a delivery opening through which the delivery tube extends.

2. The glass manufacturing apparatus of claim 1, wherein the forming apparatus comprises a pair of forming rolls spaced apart and defining a gap therebetween, the pair of forming rolls configured to receive the stream of molten material within the gap.

3. The glass manufacturing apparatus of claim 1, wherein a width of the first thermal expansion slot varies.

4. The glass manufacturing apparatus of claim 1, wherein the first plate comprises a first plurality of thermal expansion slots and the second plate comprises a second plurality of thermal expansion slots.

5. The glass manufacturing apparatus of claim 1, wherein the first plate comprises a first passage configured to direct a first gas flow towards the travel plane.

6. The glass manufacturing apparatus of claim 5, wherein the first plate comprises a first plate layer and a second plate layer attached to the first plate layer, the first plate layer spaced apart from the second plate layer to form the first passage between the first plate layer and the second plate layer, the first passage terminating at a first elongated orifice extending along at least a portion of a length of the first edge, the first passage coupled to a first gas source.

7. The glass manufacturing apparatus of claim 5, wherein the second plate comprises a second passage configured to direct a second gas flow towards the travel plane.

8. The glass manufacturing apparatus of claim 7, wherein the second plate comprises a third plate layer and a fourth plate layer attached to the third plate layer, the third plate layer spaced apart from the fourth plate layer to form the second passage between the third plate layer and the fourth plate layer, the second passage terminating at a second elongated orifice extending along at least a portion of a length of the second edge, the second passage coupled to a second gas source.

9. The glass manufacturing apparatus of claim 1, wherein the first plate comprises a first electrically conductive layer and a first thermally insulating layer attached to the first electrically conductive layer.

10. The glass manufacturing apparatus of claim 9, wherein the first thermally insulating layer comprises a plurality of thermally insulating layers.

11. The glass manufacturing apparatus of claim 9, wherein the first plate comprises a first electrically isolating member positioned on at least a portion of the first edge.

12. The glass manufacturing apparatus of claim 9, wherein the second plate comprises a second electrically conductive layer and a second thermally insulating layer attached to the second electrically conductive layer.

13. The glass manufacturing apparatus of claim 12, wherein the second plate comprises a second electrically isolating member positioned on at least a portion of the second edge.

14. A glass manufacturing apparatus comprising:
   a delivery tube terminating at a lower end in a delivery slot, the delivery tube configured to deliver a stream of molten material through the delivery slot along a travel plane in a travel direction to a forming apparatus;
   a first plate positioned adjacent the lower end of the delivery tube on a first side of the travel plane, the first plate comprising a first edge extending adjacent the travel plane and a first passage configured to direct a first gas flow from the first edge towards the travel plane; and
   a second plate positioned adjacent the lower end of the delivery tube on a second side of the travel plane, the second plate comprising a second edge extending adjacent the travel plane and a second passage configured to direct a second gas flow from the second edge towards the travel plane, the second edge spaced apart from the first edge to define a delivery opening through which the delivery tube extends.

15. The glass manufacturing apparatus of claim 14, wherein the first plate comprises a first plate layer and a second plate layer attached to the first plate layer, the first plate layer spaced apart from the second plate layer to form the first passage between the first plate layer and the second plate layer, the first passage terminating at a first elongated orifice extending along at least a portion of a length of the first edge, the first passage coupled to a first gas source.

16. The glass manufacturing apparatus of claim 14, wherein the first passage extends along a first axis that intersects the travel plane, the first axis defining a first angle relative to the travel plane that is within a range from about 20 degrees to about 70 degrees.

17. A glass manufacturing apparatus comprising:
   a delivery tube terminating at a lower end in a delivery slot, the delivery tube configured to deliver a stream of molten material through the delivery slot along a travel plane in a travel direction to a forming apparatus;
   a first plate positioned adjacent the lower end of the delivery tube on a first side of the travel plane, the first plate comprising a first electrically conductive layer, a first thermally insulating layer attached to the first electrically conductive layer and configured to maintain a temperature of the molten material exiting the delivery tube through the delivery slot;
   a second plate positioned adjacent the lower end of the delivery tube on a second side of the travel plane, the second plate comprising a second edge spaced apart from the first edge to define a delivery opening within which the delivery tube extends; and
   wherein the first electrically conductive layer is not in contact with the delivery tube.

18. The glass manufacturing apparatus of claim 17, wherein the first plate comprises a first electrically isolating member positioned on at least a portion of a first edge of the first plate and configured to electrically isolate the first electrically conductive layer from the delivery tube.

19. The glass manufacturing apparatus of claim 18, wherein the first electrically isolating member comprises a ceramic material.

20. The glass manufacturing apparatus of claim 17, wherein the first thermally insulating layer comprises a plurality of thermally insulating layers.

* * * * *